(12) United States Patent
Hammer

(10) Patent No.: US 11,233,679 B2
(45) Date of Patent: Jan. 25, 2022

(54) PHASE ADJUSTMENTS FOR COMPUTER NODES

(71) Applicant: HEWLETT PACKARD ENTERPRISE DEVELOPMENT LP, Houston, TX (US)

(72) Inventor: Mark Barlow Hammer, Houston, TX (US)

(73) Assignee: Hewlett Packard Enterprise Development LP, Houston, TX (US)

(*) Notice: Subject to any disclaimer, the term of this patent is extended or adjusted under 35 U.S.C. 154(b) by 64 days.

(21) Appl. No.: 16/888,901

(22) Filed: Jun. 1, 2020

(65) Prior Publication Data

US 2021/0377082 A1 Dec. 2, 2021

(51) Int. Cl.
*H04L 25/49* (2006.01)
*H04J 3/06* (2006.01)

(52) U.S. Cl.
CPC ........ *H04L 25/4902* (2013.01); *H04J 3/0638* (2013.01)

(58) Field of Classification Search
CPC ......... H04L 25/00; H04L 25/38; H04L 25/40; H04L 25/49; H04L 25/4902; H04J 3/00; H04J 3/02; H04J 3/06; H04J 3/0635; H04J 3/0638; G06F 1/3237; G06F 1/324; G06F 1/3287
See application file for complete search history.

(56) References Cited

U.S. PATENT DOCUMENTS

| | | | | |
|---|---|---|---|---|
| 5,576,943 A * | 11/1996 | Keir | ...................... | H02M 7/538 363/56.05 |
| 6,182,232 B1 * | 1/2001 | Klein | ...................... | G06F 1/206 713/340 |
| 7,508,900 B2 * | 3/2009 | Kris | ........................ | H03K 7/08 341/53 |
| 8,205,134 B2 * | 6/2012 | Harrison | ............... | H04L 9/0662 714/758 |
| 9,058,155 B2 * | 6/2015 | Cepulis | ..................... | G06F 1/26 |
| 9,294,148 B1 * | 3/2016 | van Casteren | ......... | H04B 3/548 |
| 9,722,662 B2 * | 8/2017 | Yamaoka | ............... | H04B 3/145 |
| 10,038,547 B2 * | 7/2018 | Lecourtier | ............ | H04J 3/0638 |
| 10,127,858 B1 * | 11/2018 | Zhou | ..................... | G09G 3/3216 |
| 10,152,112 B2 * | 12/2018 | Ehmann | ................ | G06F 1/3228 |
| 10,606,330 B2 * | 3/2020 | Maheswaran | ............. | G06F 1/28 |

(Continued)

OTHER PUBLICATIONS

Hewlett Packard Enterprise, Technical White Paper, HPE Edgeline EL8000 Converged Edge Systems for telecommunications and media edge, 2019 (11 pages).

(Continued)

*Primary Examiner* — James M Perez
(74) *Attorney, Agent, or Firm* — Trop, Pruner & Hu, P.C.

(57) ABSTRACT

In some examples, a controller includes an interface to receive presence indicators associated with computer nodes, and a processor to determine, based on the presence indicators, a quantity of a set of computer nodes that are present in a system, and adjust, based on the determined quantity, phases of activity control indications provided to the computer nodes of the set of computer nodes, wherein the adjusting is to vary a first phase of a first activity control indication of the activity control indications relative to a second phase of a second activity control indication of the activity control indications.

20 Claims, 4 Drawing Sheets

(56) References Cited

U.S. PATENT DOCUMENTS

| | | | |
|---|---|---|---|
| 10,867,076 B2* | 12/2020 | Stearns | G06F 21/70 |
| 10,992,230 B1* | 4/2021 | Arcudia | H02M 3/158 |
| 2002/0052706 A1* | 5/2002 | Odaohhara | G06F 11/1417 |
| | | | 702/119 |
| 2005/0017699 A1* | 1/2005 | Stanley | H02M 1/4208 |
| | | | 323/282 |
| 2005/0102542 A1* | 5/2005 | Nishida | G06F 1/28 |
| | | | 713/300 |
| 2007/0049133 A1* | 3/2007 | Conroy | G06F 1/28 |
| | | | 439/894 |
| 2007/0050647 A1* | 3/2007 | Conroy | G06F 1/3203 |
| | | | 713/300 |
| 2008/0253085 A1* | 10/2008 | Soffer | G06F 1/18 |
| | | | 361/679.4 |
| 2008/0265869 A1* | 10/2008 | Babb | G01R 31/40 |
| | | | 324/86 |
| 2008/0304300 A1* | 12/2008 | Raju | H02M 7/217 |
| | | | 363/126 |
| 2009/0206804 A1* | 8/2009 | Xu | H02M 3/1584 |
| | | | 323/234 |
| 2012/0204577 A1* | 8/2012 | Ludwig | F25B 21/04 |
| | | | 62/3.3 |
| 2013/0082747 A1* | 4/2013 | Kris | G06F 1/04 |
| | | | 327/114 |
| 2013/0082795 A1* | 4/2013 | Kris | H03K 7/08 |
| | | | 332/109 |
| 2015/0180535 A1* | 6/2015 | Yamaoka | H04B 3/145 |
| | | | 323/274 |
| 2015/0220138 A1* | 8/2015 | Jones | G06F 1/26 |
| | | | 713/323 |
| 2015/0326021 A1* | 11/2015 | Cousineau | H02J 4/00 |
| | | | 307/52 |
| 2016/0183351 A1* | 6/2016 | Snyder | H04L 12/413 |
| | | | 315/152 |
| 2016/0218703 A1* | 7/2016 | Nielsen | H03F 3/183 |
| 2016/0219679 A1* | 7/2016 | Snyder | H05B 45/397 |
| 2016/0282832 A1* | 9/2016 | Ishigaki | H02J 3/322 |
| 2017/0040813 A1* | 2/2017 | Hu | H02J 7/02 |
| 2017/0040817 A1* | 2/2017 | Hu | H02J 7/007182 |
| 2017/0093310 A1* | 3/2017 | Fang | H02P 6/04 |
| 2017/0293335 A1* | 10/2017 | Dunstan | H02J 7/00 |
| 2017/0329383 A1* | 11/2017 | Bailey | G06F 1/3234 |
| 2018/0032120 A1* | 2/2018 | Maheswaran | G06F 1/263 |
| 2018/0307288 A1* | 10/2018 | Huang | G06F 1/266 |
| 2019/0332812 A1* | 10/2019 | Stearns | G06F 21/81 |
| 2019/0341851 A1* | 11/2019 | Yuzurihara | H02M 3/1584 |
| 2020/0274375 A1* | 8/2020 | Griffiths | H02J 7/1423 |
| 2020/0321872 A1* | 10/2020 | Upadhyaya | H02M 3/1584 |
| 2020/0326760 A1* | 10/2020 | Hammer | H05K 7/20736 |
| 2021/0028705 A1* | 1/2021 | Ishikura | H02M 1/32 |
| 2021/0100082 A1* | 4/2021 | Aoki | H05B 45/305 |
| 2021/0152080 A1* | 5/2021 | Lukic | H01F 27/325 |
| 2021/0167688 A1* | 6/2021 | Hureau | H02M 3/1584 |
| 2021/0296989 A1* | 9/2021 | Chen | H02M 1/08 |

OTHER PUBLICATIONS

HP Power Capping and HP Dynamic Power Capping for ProLiant servers, Technology brief, 2nd Edition, 2010 (25 pages).
HP, Technical white paper, HP ProLiant Server Power Management, Red Hat Enterprise Linux 6.x and 7.x, 2014 (16 pages).
HPE Edgeline EL4000 System, QuickSpecs, Mar. 2017 (27 pages).
HPE Edgeline EL4000 System, QuickSpecs, May 2020 (19 pages).

* cited by examiner

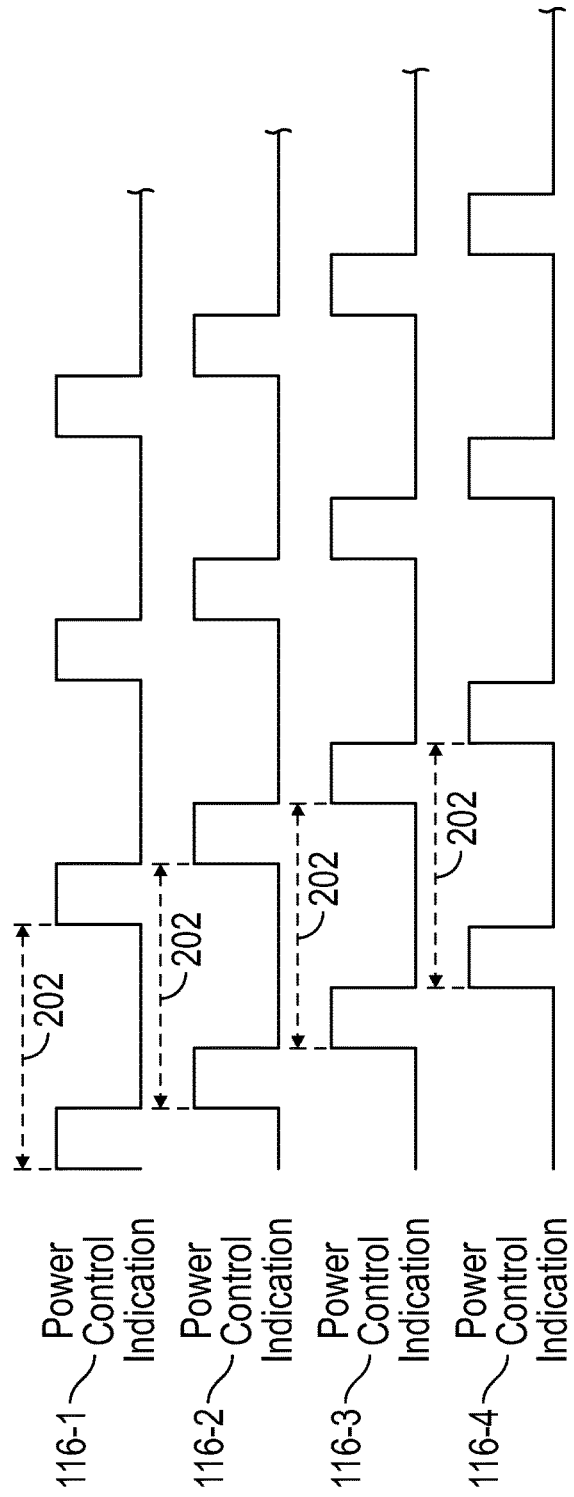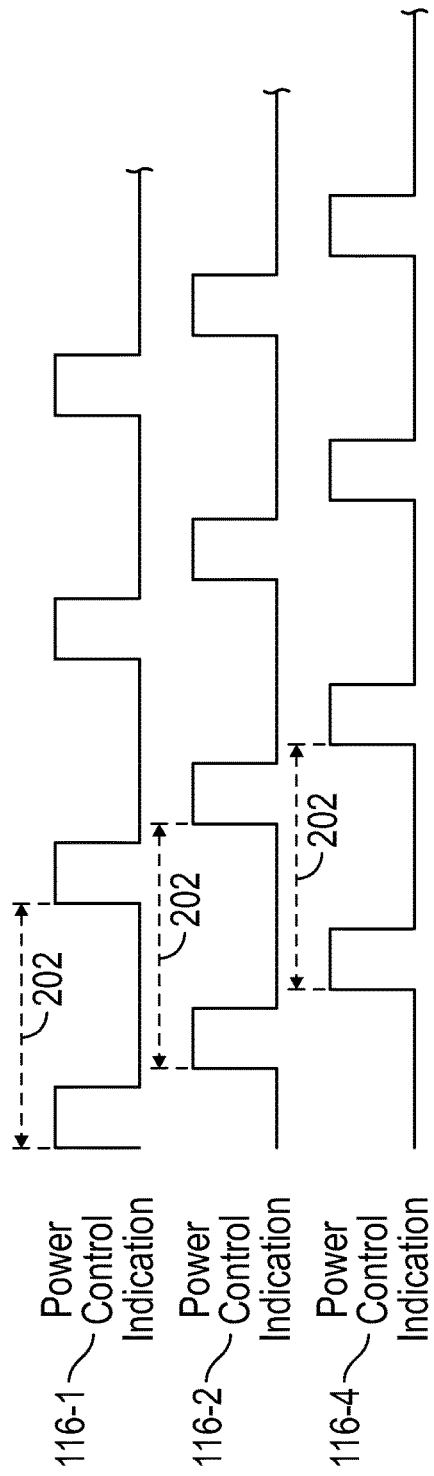

PHASE ADJUSTMENTS FOR COMPUTER NODES

BACKGROUND

A computer includes various electronic components that consume power during operation. Power capping can be applied to a system that includes a computer (or multiple computers) to keep power consumption of the system below a specified power threshold.

BRIEF DESCRIPTION OF THE DRAWINGS

Some implementations of the present disclosure are described with respect to the following figures.

FIGS. 2A-2B are timing diagrams illustrating variable phase offsets among computer nodes, according to some examples.

Figure 1:
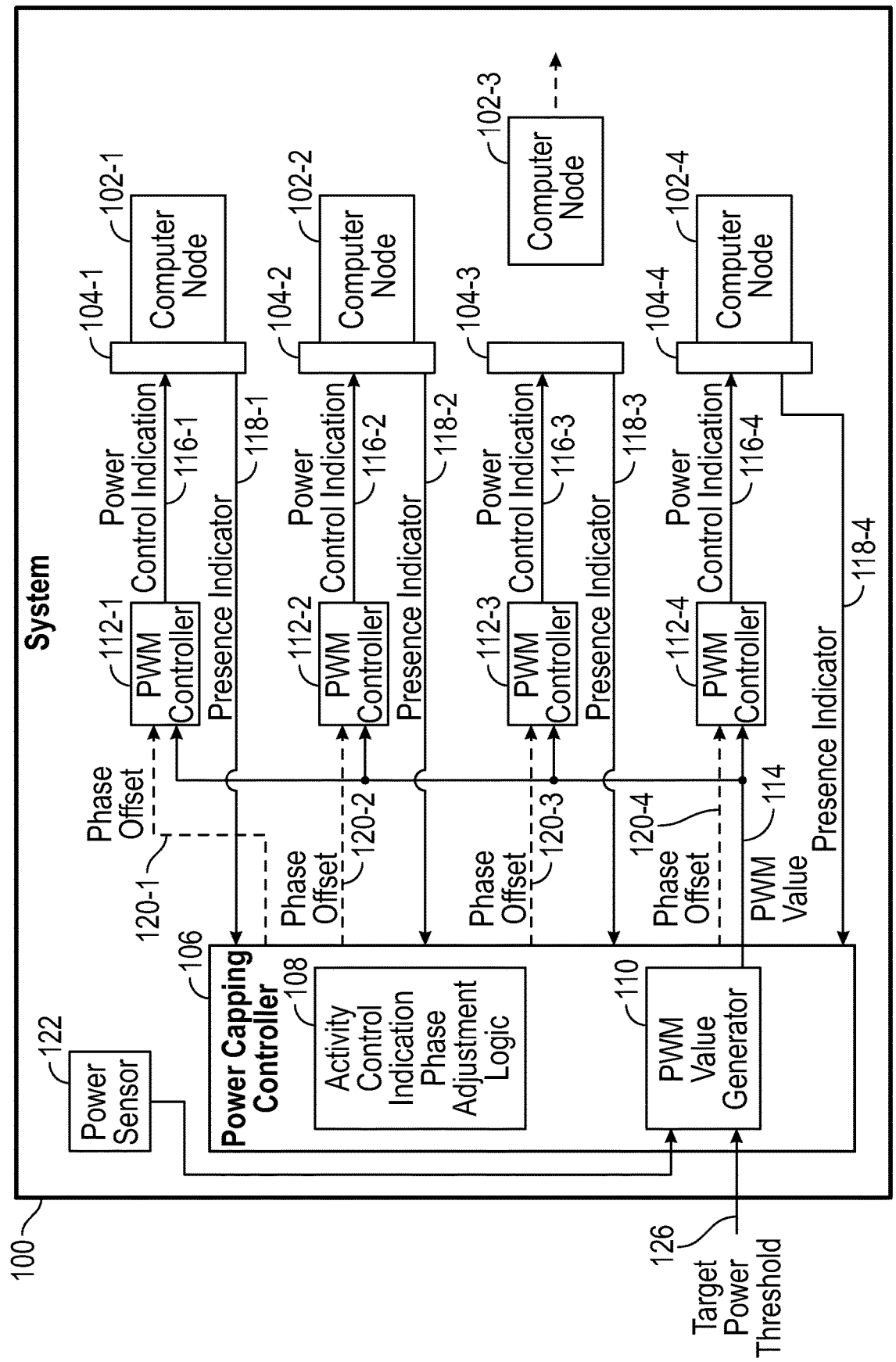
FIG. 1 is a block diagram of a computer according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A system can include multiple computer nodes that consume power during operation. A "computer node" can refer to a computer (e.g., a server computer, a desktop computer, a notebook computer, a tablet computer, etc.), a communication node (e.g., a switch, a router, etc.), a storage node (e.g., a storage server, a storage controller, etc.), a processor, a core of a multi-core processor, a collection of processors or processor cores, or any other type of electronic device.

To perform power capping of the system that includes multiple computer nodes, the activity of each computer node can be controlled to vary the computer node between different operational states such that the overall power consumption of the system is maintained below a specified power threshold. The different operational states can include a first operational state and a second operational state, where a computer node in the second operational state consumes less power than in the first operational state. The second operational state of the computer node can be a sleep state, a state where a clock signal to the computer node is disabled or runs at a slower rate than a normal rate, or any other state of the computer node at which activity of the computer node is reduced from the first operational state of the computer node such that the computer node consumes less power.

In some examples, the first operational state is a peak operational state of the computer node, and the second operational state is a minimum operational state of the computer node. At the peak operational state, the computer node is allowed to run at its maximum operating speed without restrictions. At the minimum operational state, the computer node runs at a minimum operating speed.

In other examples, the different operational states can include more than two operational states at which a computer node consumes corresponding different amounts of power. For example, an intermediate operational state (or multiple different intermediate operational states) of the computer node may be provided between the peak operational state and the minimum operational state.

The operational state of a computer node can be varied based on use of an activity control indication, which can be selectively set to different states to cause the computer node to operate at respective different operational states. As an example, the activity control indication includes a signal (which can be referred to as a "stop clock signal" or any other type of signal) that can be selectively set to an active state or an inactive state. The signal is provided as an input to a computer node to control the operational state of the computer node.

When the signal is set to the active state, the computer node operates in the second operational state (associated with a lower power consumption level). When the signal is set to the inactive state, the computer node is set to the first operational state (associated with a higher power consumption level). An active state of the signal can be a high state or a low state, and an inactive state of the signal can be the other of the high state or low state. In some examples, the activity control indication can include multiple signals to cause the computer node to vary among more than two operational states.

In other examples, the activity control indication can be in a different form, such as in the form of a command, a message, an information element, and so forth. In such latter examples, the different states of the activity control indication can include different values of the command, the message, the information element, and so forth. The different values of the activity control indication that are input into a computer node causes the computer node to operate at respective different operational states.

Pulse width modulation (PWM) can be applied to an activity control indication to control a relative amount of time that the activity control indication is at the first state as compared to the second state during a specified time interval (also referred to as a "duty cycle"). During the specified time interval (or duty cycle), PWM control of the activity control indication can cause the activity control indication to be at the first state a certain percentage of the time of the duty cycle, and to be at the second state the remaining percentage of the time of the duty cycle. For example, if the PWM control results in the certain percentage being 25%, then the activity control indication is set at the first state 25% of the time of the duty cycle, and is set at the second state 75% of the time of the duty cycle.

In a system with multiple computer nodes, respective different activity control indications can be provided to different computer nodes. To apply power capping in the system with multiple computer nodes, PWM can be applied to the different activity control indications (or a subset of the activity control indications) to restrict power consumption of the system to be below a specified power threshold.

Switching a large number of computer nodes of the system between the different operational states (such as between a peak performance state and a minimum performance state) can cause large fluctuations in power consumption of the overall system. For example, if a large number of computer nodes are being switched between the minimum performance state and the peak performance state at the same time (or within a small time window), the power consumption swing can be quite large. The amplitude of the power consumption swing can be referred to as a "power ripple." A large power ripple can result in fluctuations of a power supply (or multiple power supplies) of the system, which can cause faulty operation or may even damage some electronic components. Moreover, a power capping controller may attempt to reduce the overall performance of the system (to reduce the amplitudes of power consumption swings).

In some examples, to reduce power consumption swings, transitions of activity control indications provided to multiple computer nodes can be set to different phases, such that the transitions between different states of the activity control indications can be out of phase relative to one another. For example, by setting the transitions of a first activity control indication and a second activity control indication to different phases, the transition of the first activity control indication between the first state and the second state is out of phase (occurs at a different time) relative to the transition of the second activity control indication between the first state and the second state. Setting the transitions of multiple activity control indications to different phases spreads out the power ripples of the computer nodes, such that the high operational states and low operational states of the different computer nodes are spread out and can potentially cancel each other out, or more generally can reduce the amplitudes of power consumption swings.

In some examples, the phases of the different activity control indications are fixed, based on the assumption that the quantity of computer nodes in a system generally remains fixed. However, if the quantity of computer nodes in the system were to vary (e.g., due to removal of a computer node or addition of a computer node), then the fixed phases of the activity control indications can result in suboptimal performance since power consumption swings may no longer be balanced among the computer nodes.

In accordance with some implementations of the present disclosure, a power capping controller can receive presence indicators associated with computer nodes, determine, based on the presence indicators, a quantity of a set of computer nodes that are present in a system, and dynamically adjust, based on the determined quantity, phases of activity control indications provided to the computer nodes of the set of computer nodes, where the adjusting is to vary a first phase of a first activity control indication of the activity control indications relative to a second phase of a second activity control indication of the activity control indications.

As used here, a "controller" can refer to a hardware processing circuit, which can include any or some combination of a microprocessor, a core of a multi-core microprocessor, a microcontroller, a programmable integrated circuit, a programmable gate array, or another hardware processing circuit. Alternatively, a "controller" can refer to a combination of a hardware processing circuit and machine-readable instructions (software and/or firmware) executable on the hardware processing circuit.

FIG. 1 depicts a system 100 that includes multiple computer nodes 102-1, 102-2, 102-3, and 102-4. Although the example system 100 of FIG. 1 includes four computer nodes, in other examples, a different number of computer nodes (less than four or greater than four) can be employed in the system 100.

In the example of FIG. 1, the computer nodes 102-1, 102-2, and 102-4 are plugged into respective connectors 104-1, 104-2, and 104-4. A "connector" can refer to a connection structure that allows for a first electronic component to communicate with another electronic component when the first electronic component is plugged into the connector. A connector can include an electrical connector to electrically connect electronic components so that the electronic components can communicate using electrical signals. Alternatively, a connector can include an optical connector to optically connect electronic components so that the electronic components can communicate using optical signals. In further examples, a connector can include a combination electrical and optical connector.

In the example of FIG. 1, the computer node 102-3 has been unplugged (disconnected) from the connector 104-3. For example, a user of the system 100 may disconnect the computer node 102-3 to perform maintenance on the computer node 102-3, to replace the computer node 102-3 with a new computer node, or for another purpose.

When the computer node 102-3 is plugged into the connector 104-3, the system 100 has four computer nodes that can be active at the same time. When the computer node 102-3 is unplugged from the connector 104-3, the system 100 includes three computer nodes that can be active at the same time.

The system 100 includes a power capping controller 106 that is able to adjust phases of activity control indications provided to the computer nodes based on a quantity of a set of computer nodes that are present in the system 100. A quantity of a set of computer nodes refers to how many computer nodes are part of the set of computer nodes. When the computer node 102-3 is plugged into the connector 104-3, the quantity of the set of computer nodes that are present in the system 100 is four. However, when the computer node 102-3 is unplugged from the connector 104-3, then the quantity of the set of computer nodes that are present in the system 100 is three.

The power capping controller 106 includes an activity control indication phase adjustment logic 108, which can be implemented either as a portion of the hardware processing circuit of the power capping controller 106, or alternatively, as machine-readable instructions that are executable by the power capping controller 106.

The power capping controller 106 also includes a PWM value generator 110 that produces a PWM value 114 (or PWM values) provided to corresponding PWM controllers 112-1, 112-2, 112-3, and 112-4. In some examples, the same PWM value 114 is provided to each of the PWM controllers 112-1 to 112-4. In other examples, different PWM values are provided to respective different PWM controllers 112-1 to 112-4.

In the ensuing discussion, reference is made to an example where the PWM value generator 110 provides a single PWM value 114 to the PWM controllers 112-1 to 112-4. Similar techniques can be applied in other examples where the PWM value generator 110 provides multiple PWM values 114 to the PWM controllers 112-1 to 112-4.

Although FIG. 1 shows the PWM controllers 112-1 to 112-4 as being separate from the power capping controller 106, in other examples, the PWM controllers 112-1 to 112-4 can be included (i.e., integrated) in the power capping controller 106.

The system 100 includes a power sensor 122 that detects a power consumption of the system 100, such as a power consumption of the computer nodes plugged into the system 100. The power sensor 122 can include a current sensor that measures an electrical current that when multiplied by a power voltage provides the power consumption.

The PWM value generator 110 compares the consumed power (based on the power consumption determined from a measurement of the power sensor 122) to a target power threshold 126 to determine whether power capping is to be performed. If the determined power consumption exceeds or is within some specified range of the target power threshold 126, then the PWM value generator 110 applies power capping by setting the PWM value 114 to less than 100%.

Based on the PWM value 114, the PWM controllers 112-1 to 112-4 produce respective PWM-controlled power control indications 116-1, 116-2, 116-3, and 116-4. The PWM value 114 controls the relative amounts of time that a PWM-controlled power control indication 116-$i$ ($i$=1 to 4) produced by a PWM controller 112-$i$ is set to a first state and to a second state during a duty cycle. In some examples, the PWM value 114 can be expressed as a fractional value that controls the relative amount of times that the PWM-controlled power control indication is set to the first state and the second state.

For example, if the PWM value generator 110 sets the PWM value 114 equal 40%, then the PWM controller 112-$i$ applies PWM control on the respective activity control indication 116-$i$ to set the activity control indication 116-$i$ to the first state (e.g., inactive state of a stop clock signal) for 40% of the duty cycle, and to the second state (e.g., active state of the stop clock signal) for 60% of the duty cycle.

The power control indication 116-$i$ is provided by the PWM controller 112-$i$ to a corresponding connector 104-$i$. The respective computer node 102-$i$ connected to the connector 104-$i$ receives the power control indication 116-$i$ and sets the operational state of the computer node 102-$i$ according to the PWM-controlled power control indication 116-$i$. When the power control indication 116-$i$ is set to the first state during the duty cycle, the computer node 102-$i$ operates in a first operational state. When the power control indication 116-$i$ is set to the second state during the duty cycle, the computer node 102-$i$ operates in a second operational state.

Each connector 104-$i$ also outputs a presence indicator 118-$i$, which is provided as an input to the power capping controller 106. As shown in FIG. 1, the connectors 104-1, 104-2, 104-3, and 104-4 output respective presence indicators 118-1, 118-2, 118-3, and 118-4. In some examples, the presence indicator 118-$i$ went set to a first value indicates that a respective computer node 102-$i$ is present (i.e., plugged into the respective connector 104-$i$). The presence indicator 118-$i$ when set to a different second value indicates that the respective computer node 102-$i$ is not present (i.e., is unplugged from the connector 104-$i$, such as the computer node 102-3 shown in FIG. 1).

In some examples, each presence indicator 118-$i$ can be tied through a pullup resistor to a high voltage or through a pulldown resistor to a low voltage. The presence indicator 118-$i$ in such examples is either pulled to a high state by the pullup resistor or pulled to a low state by the pulldown resistor when the corresponding computer node 102-$i$ is unplugged from the connector 104-$i$. However, once the corresponding computer node 102-$i$ is plugged into the connector 104-$i$, the corresponding computer node 102-$i$ drives the presence indicator 118-$i$ to the opposite state (that opposes the state set by the pullup resistor or the pulldown resistor).

In alternative examples, each presence indicator 118-$i$ can be set using a different mechanism to indicate presence or absence of the corresponding computer node 102-$i$.

In some examples, each presence indicator 118-$i$ is in the form of a signal that when set to an active state (corresponding to the "first value" of the presence indicator 118-$i$ noted above) indicates that the respective computer node 102-$i$ is plugged into the connector 104-$i$, and when set to inactive state (corresponding to the "second value" of the presence indicator 118-$i$ noted above) indicates that the respective computer node 102-$i$ is unplugged from the connector 104-$i$.

The activity control indication phase adjustment logic 108 of the power capping controller 106 receives the presence indicators 118-1, 118-2, 118-3, and 118-4, and makes a determination of the quantity of the set of computer nodes that are present in the system 100, based on the corresponding values of the presence indicators 118-1 to 118-4. For example, the activity control indication phase adjustment logic 108 can count the number of presence indicators that are set to the first value. As another example, the activity control indication phase adjustment logic 108 can count the number of presence indicators that are set to the second value to identify which computer node(s) is (are) unplugged and thus missing from the system 100. Based on the identified quantity of missing computer node(s), the activity control indication phase adjustment logic 108 is able to determine how many computer nodes are present in the system 100.

Based on the determined quantity of the set of computer nodes that are present in the system 100, the activity control indication phase adjustment logic 108 produces respective phase offsets that are provided to PWM controllers for computer nodes that are present in the system 100.

As shown in FIG. 1, the activity control indication phase adjustment logic 108 is able to generate phase offsets 120-1, 120-2, 120-3, and 120-4, which can be used for controlling relative phases of the PWM-controlled power control indications 116-1, 116-2, 116-3, and 116-4 when the computer nodes 102-1, 102-2, 102-3, and 102-4 are plugged into the corresponding connectors 104-1, 104-2, 104-3, and 104-4.

However, if a computer node is unplugged from the system 100 (such as the computer node 102-3), then the phase offset is set to an inactive value, which indicates to the corresponding PWM controller that the respective computer node is unplugged and thus the PWM controller should remain inactive.

Each phase offset 120-$i$ is a value that specifies the corresponding phase for the respective power control indication. For example, if four computer nodes are present in the system 100, then the phase offsets 120-1, 120-2, 120-3, and 120-4 can be set to 0°, 90° 180°, and 270°, respectively. A phase offset of 0° causes the PWM controller 112-1 to define the duty cycle of the power control indication 116-1 at 0° relative to a timing reference (e.g., an oscillating clock source or another timing reference) in the system 100. A phase offset of 90° causes the PWM controller 112-2 to define the duty cycle of the power control indication 116-2 at 90° relative to the timing reference in the system 100. A phase offset of 180° causes the PWM controller 112-3 to define the duty cycle of the power control indication 116-3 at 180° relative to the timing reference in the system 100. A phase offset of 270° causes the PWM controller 112-4 to define the duty cycle of the power control indication 116-4 at 270° relative to the timing reference in the system 100.

However, if the quantity of computer nodes present in the system 100 is three (such as in the case of FIG. 1 where the computer node 102-3 is unplugged from the connector 104-3), then the activity control indication phase adjustment logic 108 can set the phase offset 120-1 to 0°, set the phase offset 120-2 to 120°, and set the phase offset 120-4 to 240°.

In other examples, instead of specifying the specific phase in terms of a degree, the phase offsets 120-1 to 120-4 can instead be set to other values that are representative of corresponding phases.

FIG. 2A is a timing diagram that shows the PWM-controlled power control indications 116-1, 116-2, 116-3, and 116-4 in an example where the four computer nodes 102-1, 102-2, 102-3, and 102-4 are plugged in the system 100. The example of FIG. 2A assumes that the PWM value 114 is set at 25%, which indicates that each power control indication 116-$i$ is set to the first state (high state in the example) for 25% of a duty cycle 202, and set to the second state (the low state in the example) for 75% of the duty cycle 202.

In the example FIG. 2A, the phase offset 120-1 is set at 0°, the phase offset 120-2 is set at 90°, the phase offset 120-3 is set at 180°, and the phase offset 120-4 is set at 270°. FIG. 2A shows the relative different phases of the power control indications 116-1, 116-2, 116-3, and 116-4, where adjacent power control indications (e.g., power control indication 116-2 and adjacent power control indication 116-3) are 90° out of phase with respect to one another.

FIG. 2B shows an example where the computer node 102-3 has been unplugged from the system 100, such as shown in FIG. 1. The example of FIG. 2B also assumes the PWM value 114 is set to 25%. However, since the quantity of the set of computer nodes present in the system 100 is three in the example of FIG. 2B, the phase offsets 120-1, 120-2, and 120-4 are adjusted to different values from those shown in FIG. 2A. More specifically, in some examples, the phase offset 120-1 can be set to 0°, the phase offset 120-2 can be set to 120°, and the phase offset 120-4 can be set to 240°, where adjacent power control indications (e.g., power control indication 116-2 and adjacent power control indication 116-4) are 120° out of phase with respect to one another.

In other examples, different adjustments of the phase offsets based on the quantity of the set of computer nodes present in the system 100 can be provided.

Figure 3:
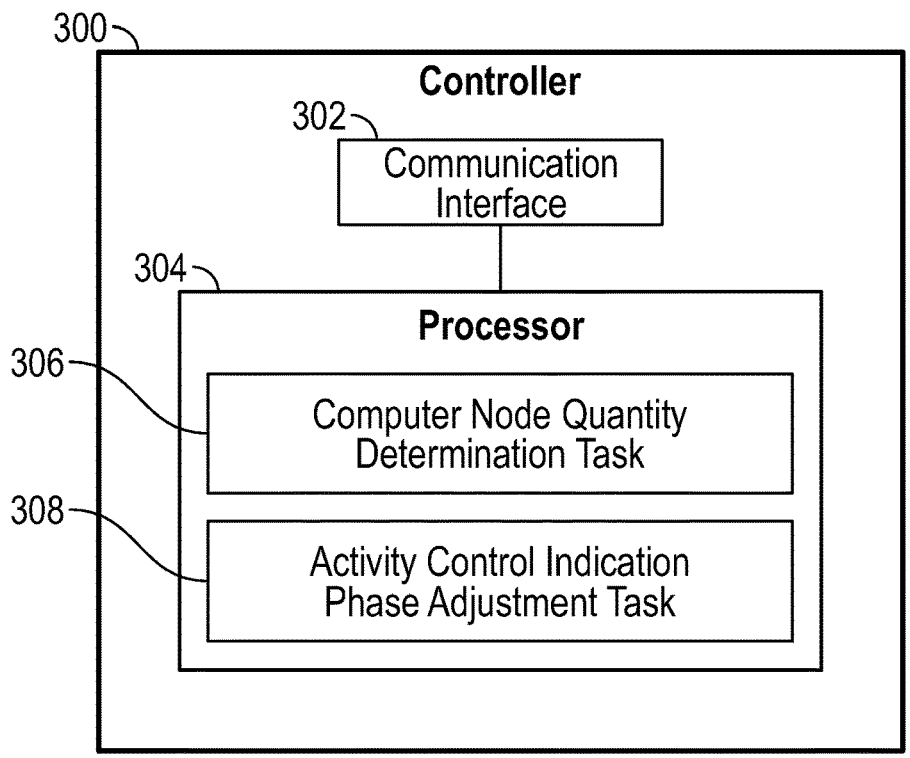
FIG. 3 is a block diagram of a controller according to some examples.

FIG. 3 is a block diagram of a controller 300 according to some examples. The controller 300 includes a communication interface 302 to receive presence indicators (e.g., 118-1 to 118-4 of FIG. 1) associated with computer nodes. In some examples, the communication interface 302 can be in the form of input circuitry connected to signals that make up the indicators.

The controller 300 includes a processor 304 to perform various tasks (referred to as "controller tasks"). A processor can include a microprocessor, a core of a multi-core microprocessor, a microcontroller, a programmable integrated circuit, a programmable gate array, or another hardware processing circuit that is part of the controller 300.

The controller tasks can be performed by the hardware processing circuit, or alternatively, can be performed by machine-readable instructions executed on the processor 304.

The controller tasks include a computer node quantity determination task 306 to determine, based on the presence indicators, a quantity of a set of computer nodes that are present in a system (e.g., 100 in FIG. 1).

In some examples, the presence indicators are from connectors (e.g., 104-1 to 104-4 in FIG. 1) to connect to corresponding computer nodes.

The controller tasks include an activity control indication phase adjustment task 308 to adjust, based on the determined quantity, phases of activity control indications provided to the computer nodes of the set of computer nodes, where the adjusting is to vary a first phase of a first activity control indication of the activity control indications relative to a second phase of a second activity control indication of the activity control indications.

In some examples, each respective activity control indication of the activity control indications is to vary between: a first state that sets a first operational state of a respective computer node, and a second state that sets a second operational state of the respective computer node, the second operational state corresponding to a lower power consumption by the respective computer node than the first operational state.

In some examples, the processor 304 applies PWM to each respective activity control indication, the PWM controlling a relative amount of time that the respective activity control indication is at the first state as compared to the second state during a specified time interval (e.g., a duty cycle).

In some examples, the processor 304 applies the PWM based on a target power consumption (e.g., 126 in FIG. 1) of the system.

In some examples, the processor 304 adjusts the phases of the activity control indications by varying phase offsets based on the determined quantity, each phase offset of the phase offsets to set a phase of a respective activity control indication of the activity control indications.

In some examples, the controller 300 sends the phase offsets to respective PWM controllers (e.g., 112-1 to 112-4 of FIG. 1) that supply the activity control indications to the set of computer nodes, in examples where the PWM controllers are separate from the controller 300.

In other examples where the PWM controllers are part of the controller 300, the controller 300 output the PWM-controlled activity control indications with the phases controlled according to the phase offsets.

Figure 4:
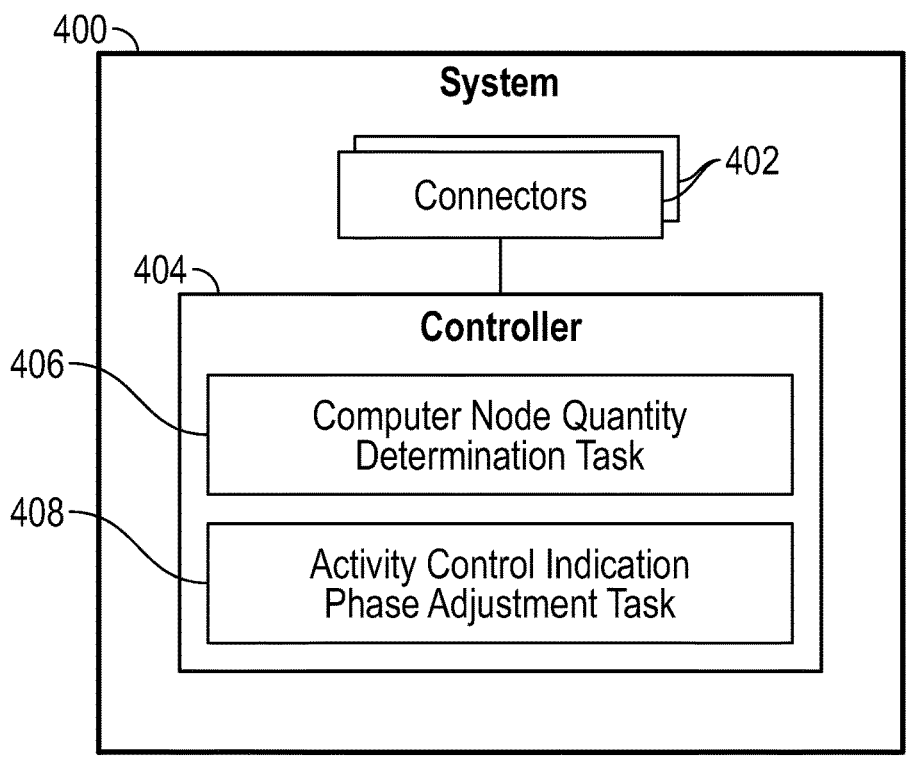
FIG. 4 is a block diagram of a system according some examples.

FIG. 4 is a block diagram of a system 400 that includes a plurality of connectors 402 to removably connect to respective computer nodes.

The system 400 includes a controller 404 to perform various controller tasks. The controller tasks include a computer node quantity determination task 406 to determine a quantity of the plurality of connectors that are connected to computer nodes within a set of computer nodes.

The controller tasks include an activity control indication phase adjustment task 408 to adjust, based on the determined quantity, phases of activity control indications provided to the computer nodes of the set of computer nodes, where the adjusting is to vary the phases by different amounts depending on how many of the plurality of connectors are not connected to computer nodes.

Figure 5:
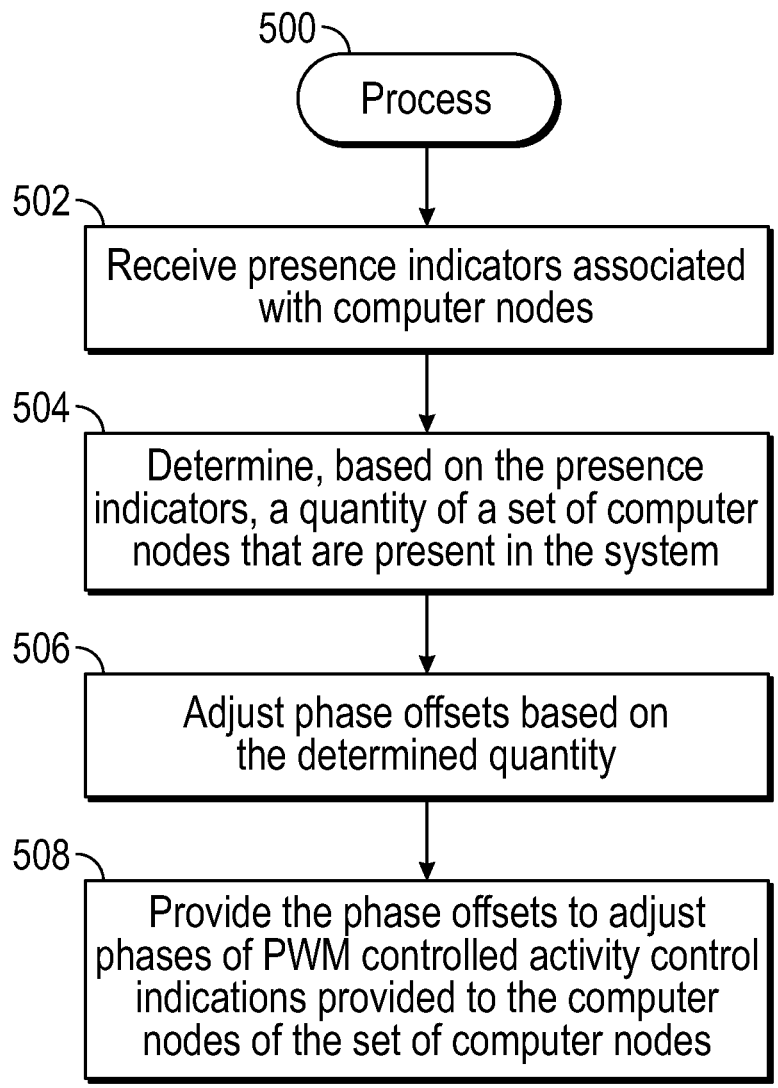
FIG. 5 is a flow diagram of a process according to some examples.

FIG. 5 is a flow diagram of a process 500 according to some examples. The process 500 can be performed by the power capping controller 106, for example.

The process 500 includes receiving (at 502), by the power capping controller 106, presence indicators associated with computer nodes.

The process 500 includes determining (at 504), by the power capping controller 106 based on the presence indicators, a quantity of a set of computer nodes that are present in the system.

The process 500 includes adjusting (at 506), by the by the power capping controller 106, phase offsets based on the determined quantity.

The process 500 includes providing (at 508), by the power capping controller 106, the phase offsets to adjust phases of PWM controlled activity control indications provided to the computer nodes of the set of computer nodes, where the adjusting is to vary a first phase of a first PWM controlled activity control indication of the PWM controlled activity control indications relative to a second phase of a second PWM controlled activity control indication of the PWM controlled activity control indications.

In examples where tasks are performed by machine-readable instructions, the machine-readable instructions can be stored in a non-transitory machine-readable or computer-readable storage medium. The storage medium can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A controller comprising:
   an interface to receive presence indicators associated with computer nodes; and
   a processor to:
      determine, based on the presence indicators, a quantity of a set of computer nodes that are present in a system, and
      adjust, based on the determined quantity, phases of activity control indications provided to the computer nodes of the set of computer nodes, wherein the adjusting is to vary a first phase of a first activity control indication of the activity control indications relative to a second phase of a second activity control indication of the activity control indications.

2. The controller of claim 1, wherein a presence indicator of the presence indicators when set to a first value indicates that a respective computer node is present, and the presence indicator when set to a different second value indicates that the respective computer node is not present.

3. The controller of claim 2, wherein the presence indicators are from connectors to connect to corresponding computer nodes.

4. The controller of claim 1, wherein each respective activity control indication of the activity control indications is to vary between:
   a first state that sets a first operational state of a respective computer node, and
   a second state that sets a second operational state of the respective computer node, the second operational state corresponding to a lower power consumption by the respective computer node than the first operational state.

5. The controller of claim 4, wherein the processor is to apply pulse width modulation (PWM) to each respective activity control indication of the activity control indications, the PWM controlling a relative amount of time that the respective activity control indication is at the first state as compared to the second state during a specified time interval.

6. The controller of claim 5, wherein the adjusting of the phases of the activity control indications adjusts phases of the activity control indications that are PWM-controlled.

7. The controller of claim 6, wherein the processor is to apply the PWM based on a target power consumption of the system.

8. The controller of claim 1, wherein the processor is to adjust the phases of the activity control indications by:
   varying phase offsets based on the determined quantity, each phase offset of the phase offsets to set a phase of a respective activity control indication of the activity control indications.

9. The controller of claim 8, wherein the controller is to:
   send the phase offsets to respective pulse width modulation (PWM) controllers that supply the activity control indications to the set of computer nodes.

10. The controller of claim 8, wherein the controller is to:
    output the activity control indications with the phases controlled according to the phase offsets.

11. The controller of claim 8, wherein the phase offsets comprise a first phase offset to set a first phase of the first activity control indication, and a second phase offset to set a second phase of the second activity control indication, the first phase offset being different from the second phase offset.

12. A system comprising:
    a plurality of connectors to removably connect to respective computer nodes; and
    a controller to:
       determine a quantity of the plurality of connectors that are connected to computer nodes within a set of computer nodes, and
       adjust, based on the determined quantity, phases of activity control indications provided to the computer nodes of the set of computer nodes, wherein the adjusting is to vary the phases by different amounts depending on how many of the plurality of connectors are not connected to computer nodes.

13. The system of claim 12, wherein the activity control indications are pulse width modulation (PWM) controlled.

14. The system of claim 13, wherein each respective PWM controlled activity control indication of the activity control indications is to vary, during a time interval, between:
    a first state that sets a first operational state of a respective computer node, and
    a second state that sets a second operational state of the respective computer node, the second operational state corresponding to a lower power consumption by the respective computer node than the first operational state.

15. The system of claim 14, wherein the PWM control determines a relative amount of time that the respective PWM controlled activity control indication is at the first state as compared to the second state during the time interval.

16. The system of claim 12, wherein presence signals are provided by the plurality of connectors to the controller, and wherein a first presence signal of the presence signals is at a first state responsive to a computer node being connected to a first connector of the plurality of connectors, and a second presence signal of the presence signals is at a different second state responsive to a second connector of the plurality of connectors not being connected to any computer node.

17. The system of claim 12, wherein the controller is to adjust the phases of the activity control indications by:
varying phase offsets based on the determined quantity, each phase offset of the phase offsets to set a phase of a respective activity control indication of the activity control indications.

18. The system of claim 17, further comprising:
pulse width modulation (PWM) controllers to supply the activity control indications to the set of computer nodes,
wherein the controller is to send the phase offsets to the PWM controllers.

19. A method of a system, comprising:
receiving, by a controller, presence indicators associated with computer nodes;
determining, by the controller based on the presence indicators, a quantity of a set of computer nodes that are present in the system;
adjusting, by the controller, phase offsets based on the determined quantity; and
providing, by the controller, the phase offsets to adjust phases of pulse width modulation (PWM) controlled activity control indications provided to the computer nodes of the set of computer nodes, wherein the adjusting is to vary a first phase of a first PWM controlled activity control indication of the PWM controlled activity control indications relative to a second phase of a second PWM controlled activity control indication of the PWM controlled activity control indications.

20. The method of claim 19, wherein the providing of the phase offsets comprises:
sending the phase offsets to PWM controllers that generate the PWM controlled activity control indications, or
using the phase offsets in the controller to generate the PWM controlled activity control indications.

* * * * *